US010351353B1

(12) United States Patent
Skarlupka

(10) Patent No.: US 10,351,353 B1
(45) Date of Patent: Jul. 16, 2019

(54) NARROW BELT CONVEYOR WITH 90 DEGREE CROSS TRANSFER

(71) Applicant: Donald Bruce Skarlupka, Deerbrook, WI (US)

(72) Inventor: Donald Bruce Skarlupka, Deerbrook, WI (US)

(73) Assignee: SKARLUPKA MFG., INC., White Lake, WI (US)

( * ) Notice: Subject to any disclaimer, the term of this patent is extended or adjusted under 35 U.S.C. 154(b) by 0 days.

(21) Appl. No.: 16/053,481

(22) Filed: Aug. 2, 2018

Related U.S. Application Data

(63) Continuation of application No. 16/052,305, filed on Aug. 1, 2018, now abandoned.

(60) Provisional application No. 62/564,723, filed on Sep. 28, 2017.

(51) Int. Cl.
| | |
|---|---|
| *B65G 13/02* | (2006.01) |
| *B65G 15/12* | (2006.01) |
| *B65G 47/54* | (2006.01) |
| *B65G 47/64* | (2006.01) |

(52) U.S. Cl.
CPC .......... *B65G 47/54* (2013.01); *B65G 13/02* (2013.01); *B65G 15/12* (2013.01); *B65G 47/643* (2013.01); *B65G 2201/0285* (2013.01)

(58) Field of Classification Search
CPC .... B65G 2207/18; B65G 13/02; B65G 47/54; B65G 47/643; B65G 21/22; B65G 15/10; B65G 15/50; B65G 15/12
USPC .................................................. 198/370.06
See application file for complete search history.

(56) References Cited

U.S. PATENT DOCUMENTS

| | | | | |
|---|---|---|---|---|
| 3,980,174 | A | * | 9/1976 | Conrad .................. B65G 15/46 198/835 |
| 4,015,484 | A | | 4/1977 | Taylor |
| 4,225,036 | A | | 9/1980 | Michael |
| 4,730,718 | A | * | 3/1988 | Fazio ..................... B65G 47/54 198/370.1 |
| 5,370,384 | A | | 12/1994 | Romanowski |
| 6,109,427 | A | | 8/2000 | Hosch et al. |

(Continued)

OTHER PUBLICATIONS

NBS® Narrow Belt Sorters, www.tgw-conveyor.com, revised Apr. 29, 2016.

(Continued)

*Primary Examiner* — James R Bidwell
(74) *Attorney, Agent, or Firm* — Stiennon & Stiennon

(57) ABSTRACT

A conveyor has looped conveying belts extending between grooved inlet and outlet rollers mounted to a frame, these rollers driven by motorized drive rollers. Each belt has an outwardly facing surface which engages a conveyed article, and an inwardly extending protrusion which engages the grooves of rollers rotatably mounted between parallel plates. The plates extend downwardly to be fixed to cross members which extend between the sides of the frame. A subframe supports upper rolls which are driven by belts connected to lower rolls, including motorized drive rolls. The subframe is mounted to an elevator platform to move the upper rolls between a retracted position and an extended position in which the upper rolls extend beyond the conveying belts which pass through gaps between the upper rolls, such that a conveyed article is moved by the upper rolls in a direction perpendicular to the direction of the conveying belts.

18 Claims, 7 Drawing Sheets

(56) References Cited

U.S. PATENT DOCUMENTS

| | | | |
|---|---|---|---|
| 6,227,377 B1 | 5/2001 | Bonnet | |
| 6,264,042 B1 * | 7/2001 | Cossey, Jr. | B07C 5/362 198/570 |
| 6,561,344 B1 * | 5/2003 | Basse | B29D 29/06 198/840 |
| 6,910,571 B1 * | 6/2005 | Ertel | B65G 21/105 193/35 R |
| 7,035,714 B2 | 4/2006 | Anderson et al. | |
| 7,287,636 B2 * | 10/2007 | Itoh | B65G 23/08 198/370.1 |
| 7,287,640 B1 | 10/2007 | Schmutzler | |
| 7,556,144 B2 | 7/2009 | Cotter et al. | |
| 7,581,632 B2 | 9/2009 | Wallace et al. | |
| 8,684,169 B2 | 4/2014 | Itoh et al. | |
| 9,216,862 B2 | 12/2015 | Wallace | |
| 9,365,361 B1 | 6/2016 | Skarlupka | |
| 2002/0108839 A1 | 8/2002 | Baker et al. | |
| 2003/0111320 A1 | 6/2003 | van Leeuwen et al. | |
| 2004/0089522 A1 | 5/2004 | Shaum | |
| 2005/0193648 A1 | 9/2005 | Klein et al. | |

OTHER PUBLICATIONS

NBS® 90 SL Narrow Belt Sorter Slave, www.tgw-conveyorcom, revised Aug. 15, 2017.

NBS® 90SP Narrow Belt Sorter—90° Small Parcel, www.tgw-conveyor.com, revised Apr. 29, 2016.

Shingle Belting Products, http://www.shinglebelting.com/products.htm?open=extrusions, dated May 30, 2017.

Dorner, 2200 Series, Belted Conveyor Features.

CNBM International Corporation, http://cnbmjacky.en.made-in-china.com/productimage/sBJxCkiZhAYf-2f1j00HjshLqoHgzk/China-Conveyor-Belt-Accessories-Cleat-Guide-Strip-Monofilament, dated May 30, 2017.

"Installation, Operation, Maintenance Manual TGW Living Logistics NBS® BR IOM Narrow Belt Sorter—Low Friction Bearing Rail," Revision Date: Nov. 26, 2014, in particular pp. 35, 38, 39, 82. Copyright TGW Systems Inc., 6870 Grand Haven Road, Spring Lake, MI 49456, USA.

"Installation, Operation, Maintenance Manual TGW Living Logistics, NBS® 90SP Narrow Belt Sorter," Jul. 27, 2016, or earlier, in particular pp. 18, 19. Copyright TGW Systems Inc., 6870 Grand Haven Road, Spring Lake, MI 49456, USA.

* cited by examiner

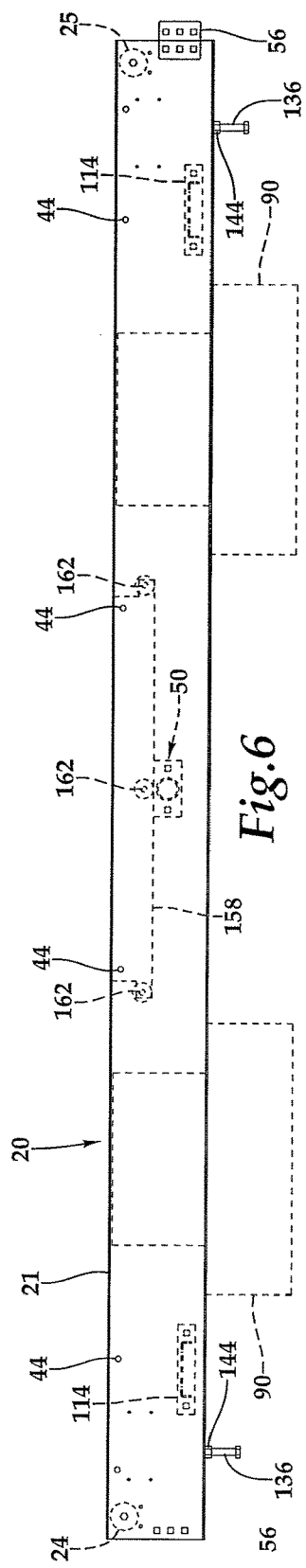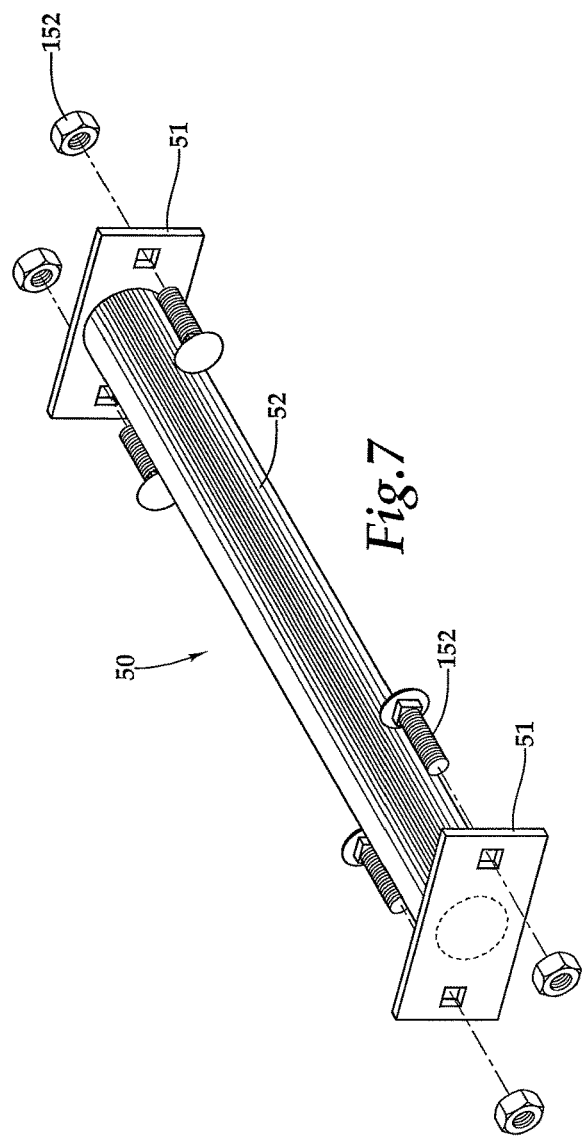

NARROW BELT CONVEYOR WITH 90 DEGREE CROSS TRANSFER

CROSS REFERENCES TO RELATED APPLICATIONS

This application is a continuation of U.S. application Ser. No. 16/052,305 filed Aug. 1, 2018, which claims priority on U.S. App. No. 62/564,723 filed on Sep. 28, 2017, the disclosure of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to belt conveyors, and more particularly to such conveyors which may shift parcels ninety degrees to the direction of travel of the belts. In my U.S. Pat. No. 9,365,361, the disclosure of which is incorporated by reference herein, I showed a right-angle conveyor in which a small multibelt conveyor could be raised up between a series of rollers, to intermittently direct parcels 90 degrees to the direction of motion of the rollers.

Known belt conveyors have a plurality of flexible looped belts which have end drive rollers and in which the belts slide over supportive fixed surfaces. These belts can securely support the weight of parcels because they are entirely supported beneath, however, there is significant friction as the belts slide on the supporting surface. The side to side course of the belts can be restrained by extending through supporting channels, at the cost of additional friction and the necessity of threading the belts through the channels. These conveyors can have single looped belts which run hundreds of feet. However, the significant friction of these long runs is overcome by high torque AC motors. The tension on the long belts can be adjusted by automatic pneumatic takeup.

Conveying systems in distribution centers can extend great distances and operate nearly continuously. It is desirable to have a system which is readily maintained and serviced, and which can be arranged and configured to the present need. Moreover, it is advantageous to dispense with pneumatic systems and all their maintenance needs.

SUMMARY OF THE INVENTION

The conveyor of the present invention has a frame to which are mounted inlet and outlet motorized DC rollers which each have a plurality of grooved wheels which correspond to the number of narrow looped conveying belts which run from the inlet to the outlet in a machine direction. Each conveying belt has an outwardly facing surface for engagement of a conveyed article, and an inwardly extending toothed protrusion which is engaged within the grooves of the inlet and outlet rollers. A plurality of rail assemblies are mounted to cross members fixed to the frame. Each rail assembly has two parallel side plates with a plurality of grooved rollers mounted therebetween. Each conveying belt extends between the side plates of a rail assembly, with the protrusion extending into the grooved rollers. The outwardly facing surfaces of the conveying belts extend upwardly above the rail assembly side plates. Bolts extend through the rail assembly side plates so as to pass through the loops of the conveying belts, and are fitted with sleeves between the rail assemblies to position them.

An assembly with a belt tension roller is associated with each rail assembly. The belt tension rollers are mounted for adjustable vertical movement to thereby engage and apply a desired tension to each looped conveying belt as it extends through the rail assembly within which it is mounted. Each rail assembly has an upper grooved return roll mounted between the parallel side plates within the looped conveying belt, such that the conveying belt protrusion is engaged within the upper return roll groove. A lower return roll is mounted between the parallel side plates exterior to the looped conveying belt.

Multiple modules of the conveyor apparatus may be positioned one after another to convey articles whatever distance is desired. To selectively shift articles ninety degrees to the direction of the conveying belts, a section of the conveyor apparatus may be modified to provide a cross-conveyor assembly mounted to the frame. The cross-conveyor assembly has an elevator platform which is mounted to the frame for movement from a retracted to an extended position. A subframe has two spaced side plates mounted to the elevator platform. Each side plate has five upwardly extending fingers. Five upper rolls are mounted to upper ends of the fingers, and five lower rolls mounted to the subframe side plates beneath the upper rolls. The upper rolls and the lower rolls rotate about axes which are parallel to the machine direction. Two of the lower rolls are motorized drive rolls, with grooved ends which are connected by horizontal belts to drive the three other lower rolls. Each upper roll is connected to a lower roll by a vertical belt, such that the upper rolls are driven to rotate in the same direction.

Gaps are defined between each pair of upper rolls and are located above the lower rolls. Each gap provides a volume through which a rail assembly extends. When the elevator platform moves from the retracted to the extended position the upper rolls are made to protrude above the outwardly facing surfaces of the conveying belts to engage a conveyed article and advance it in the cross machine direction. In both the retracted and the extended position the subframe and the lower rolls do not interfere with the advancement of the looped conveying belts.

It is an object of the present invention to provide an effective and readily maintainable conveyor.

It is a further object of the present invention to provide a conveyor which is modular and which includes modules for imparting a 90-degree turn to conveyed articles.

It is another object of the present invention to provide a narrow belt conveyor in which the motion and disposition of the belts is well regulated and suited to conveying parcels.

It is a further object of the present invention to provide a narrow belt conveyor which can operate without any pneumatic components.

Further objects, features and advantages of the invention will be apparent from the following detailed description when taken in conjunction with the accompanying drawings.

BRIEF DESCRIPTION OF THE DRAWINGS

FIG. 6 is a side elevational view of the conveyor of FIGS. 4A and 4B, showing alternate locations of the optional cross conveyor.

FIG. 7 is an exploded isometric view of the cross extending weldment of the conveyor of FIG. 6.

DESCRIPTION OF THE PREFERRED EMBODIMENTS

Figure 1:
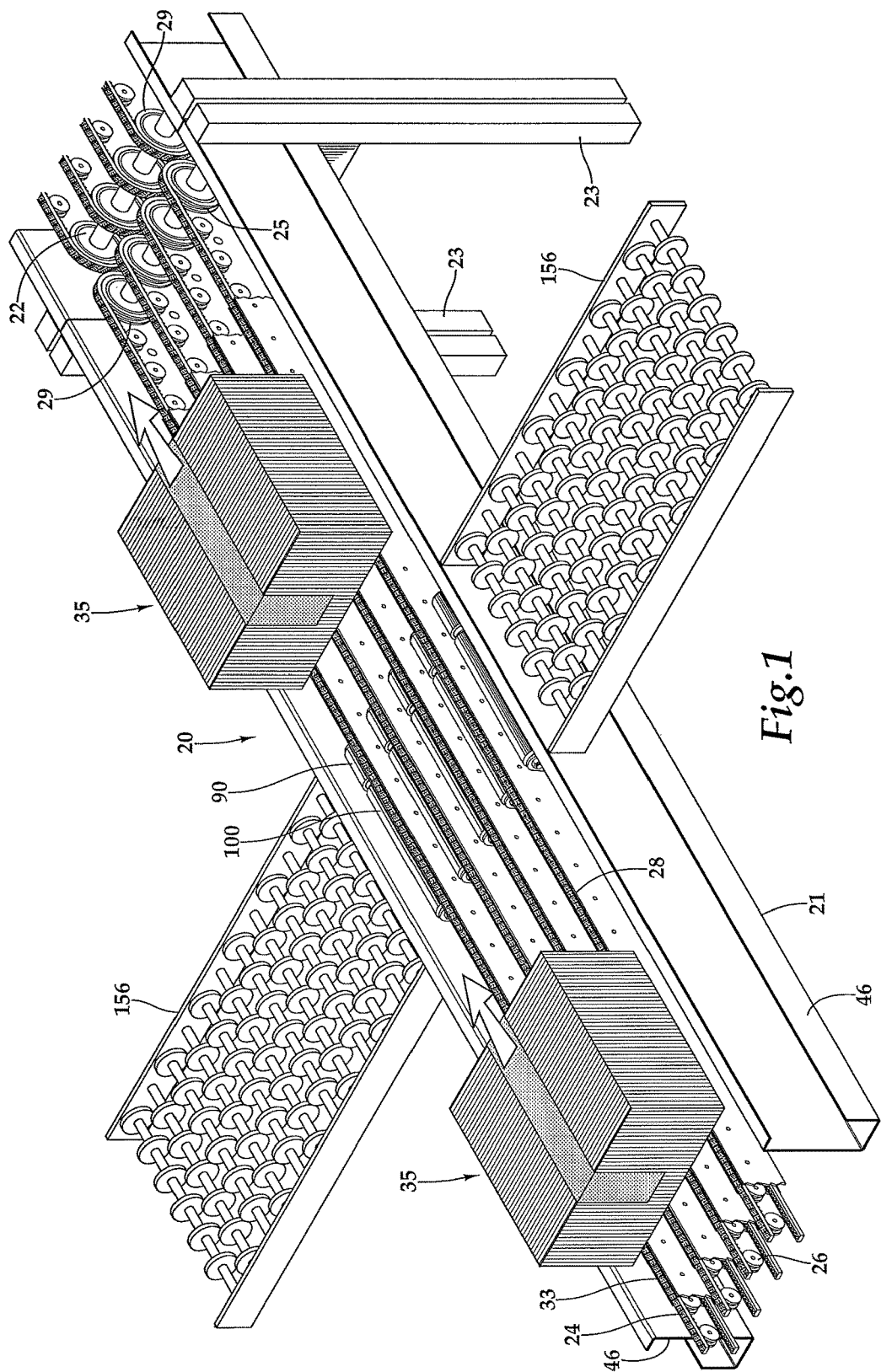
FIG. 1 is an isometric view, partially broken away, of a conveyor of this invention conveying parcels on a plurality of belts in a machine direction.

Referring more particularly to FIGS. 1-7, wherein like numbers refer to similar parts, a modular conveyor 20 is shown in FIG. 6. The conveyor 20 is about nine feet long and has a frame 21 with bent metal side members 46 as shown in FIG. 1. The frame 21 may include legs 23 to position the conveyor at a desired elevation. A plurality of conveyors 20 may be positioned end to end and their respective frames 21 secured together with connector plates 56 having six square holes to receive bolts therein.

Figure 5:
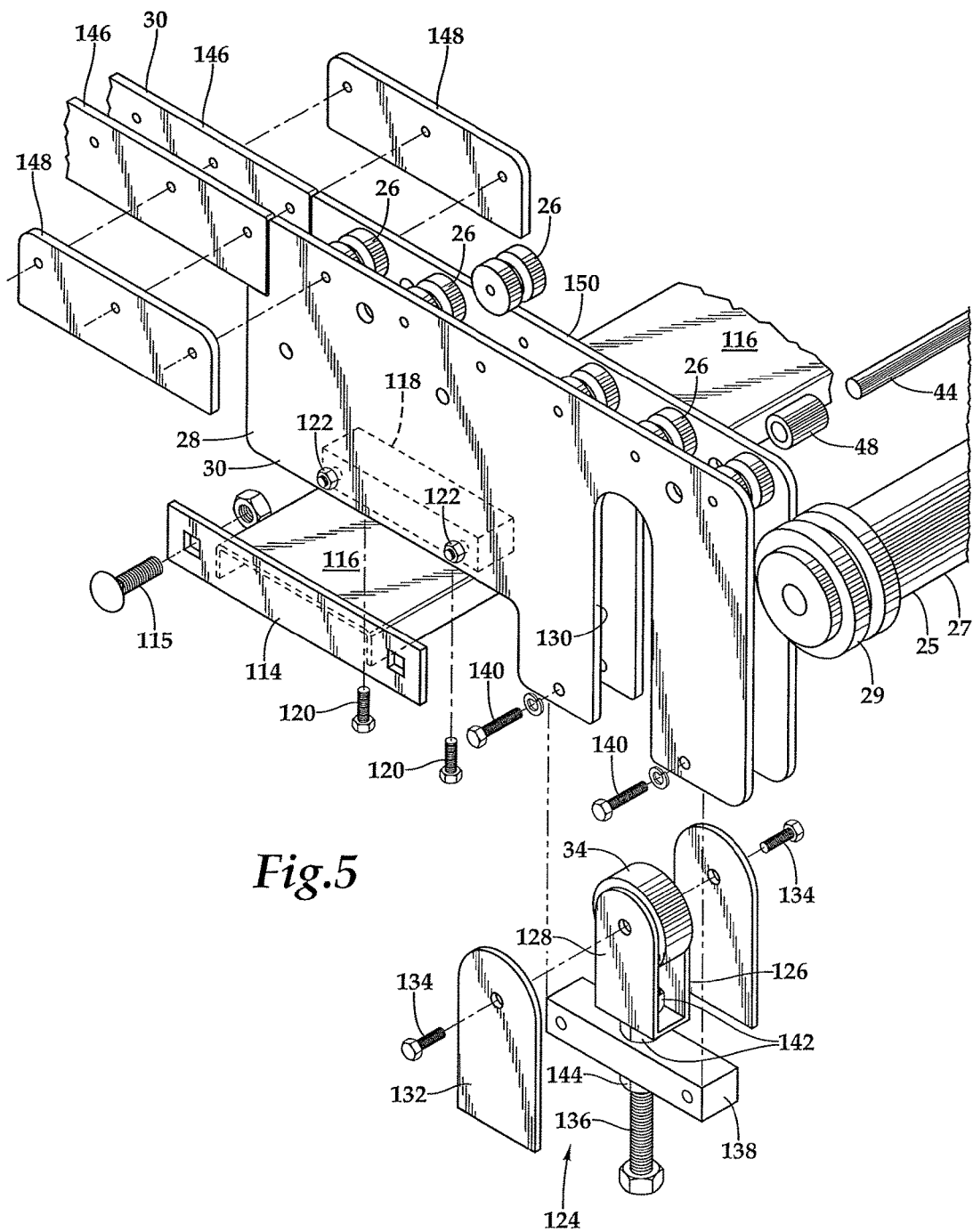
FIG. 5 is an exploded fragmentary isometric view of one of the rail assemblies of the conveyor of FIG. 1.

The conveyor 20 has an inlet motorized roller 22 and an outlet motorized roller 25 which are mounted to the side members 46 of the frame 21. Both rollers 22, 25 are for example, 1.9 inch diameter 24 V DC motors such that they may function as drive rollers. Typically both rollers will drive at the same time and may be provided with a controller, not shown, which allows the drives to work together by synching the motors in open loop. It should be noted that the conveyor 20 is symmetrical, such that it may be operated in either direction. If the direction of operation is changed, the inlet roller becomes the outlet roller, and vice versa. As shown in FIG. 5, each roller 22, 25, has a central shaft 27 to which are mounted four grooved wheels 29. Each grooved wheel 29 corresponds to a looped conveying belt 24.

Figure 3:
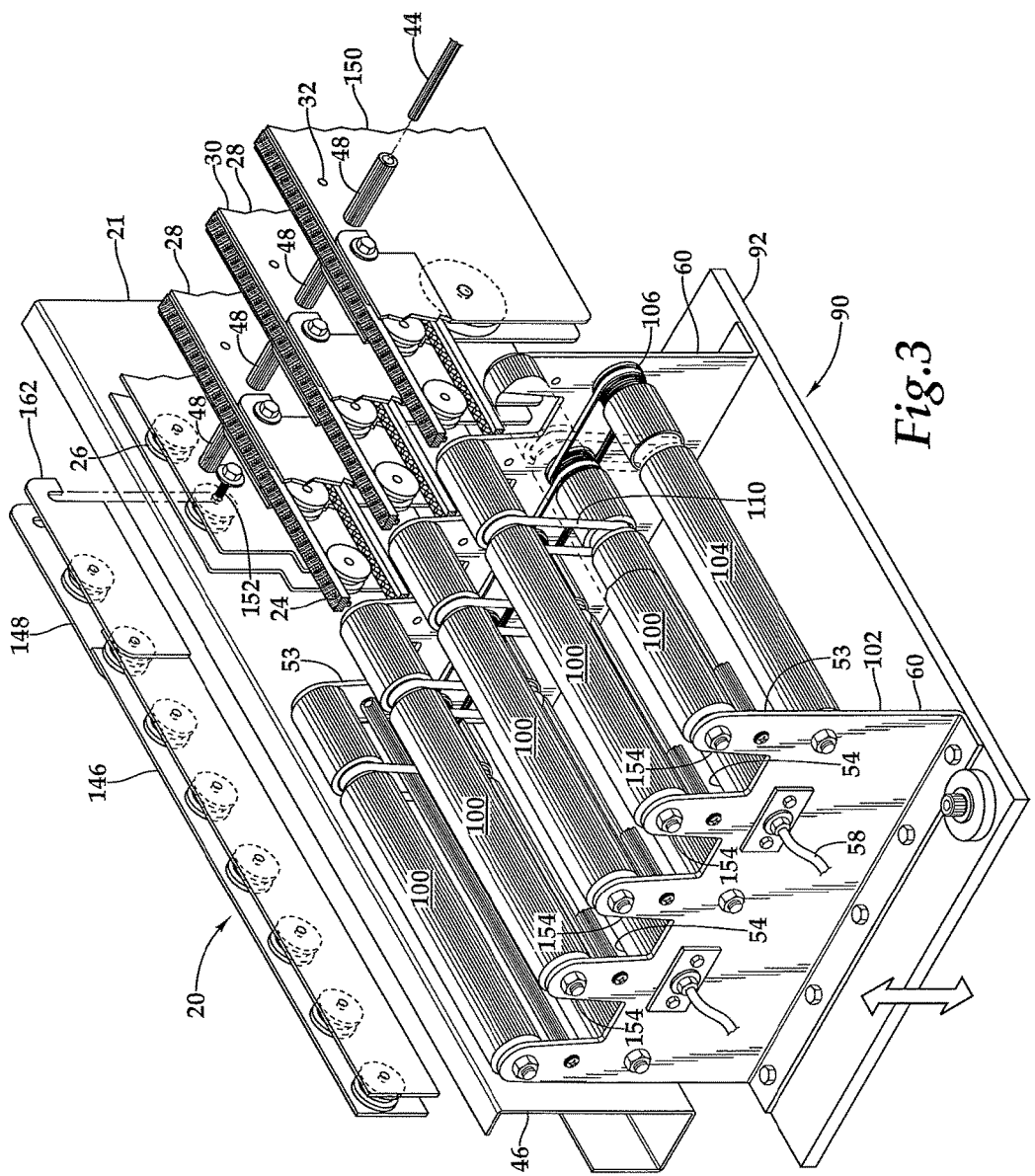
FIG. 3 is a fragmentary partially exploded isometric view of the cross conveyor of FIG. 2 shown in relation to a plurality of rail assemblies of the conveyor of FIG. 1.

Each belt 24, as shown in FIG. 3, is formed of monofilament cloth which is bonded to a cogged V-guide protrusion 31, formed of urethane. The V-shaped protrusion 31 extends inwardly into the groove of the grooved wheel 29, and is thereby positioned. The cogged protrusion 31 defines a plurality of teeth which more readily allow the belt to turn when it is looped over the inlet and outlet rollers. The outwardly facing surface 33 of the conveying belt may be formed with an aggressive ragged surface pattern, known as "rough top". This outer surface 33 engages the conveyed articles 35, shown in FIG. 1. Each belt 24 forms a loop which extends around the inlet roller 22 and the outlet roller 25. As the belt moves from the inlet roller 22 to the outlet roller 25 it advances conveyed articles in a machine direction.

Figure 4A:
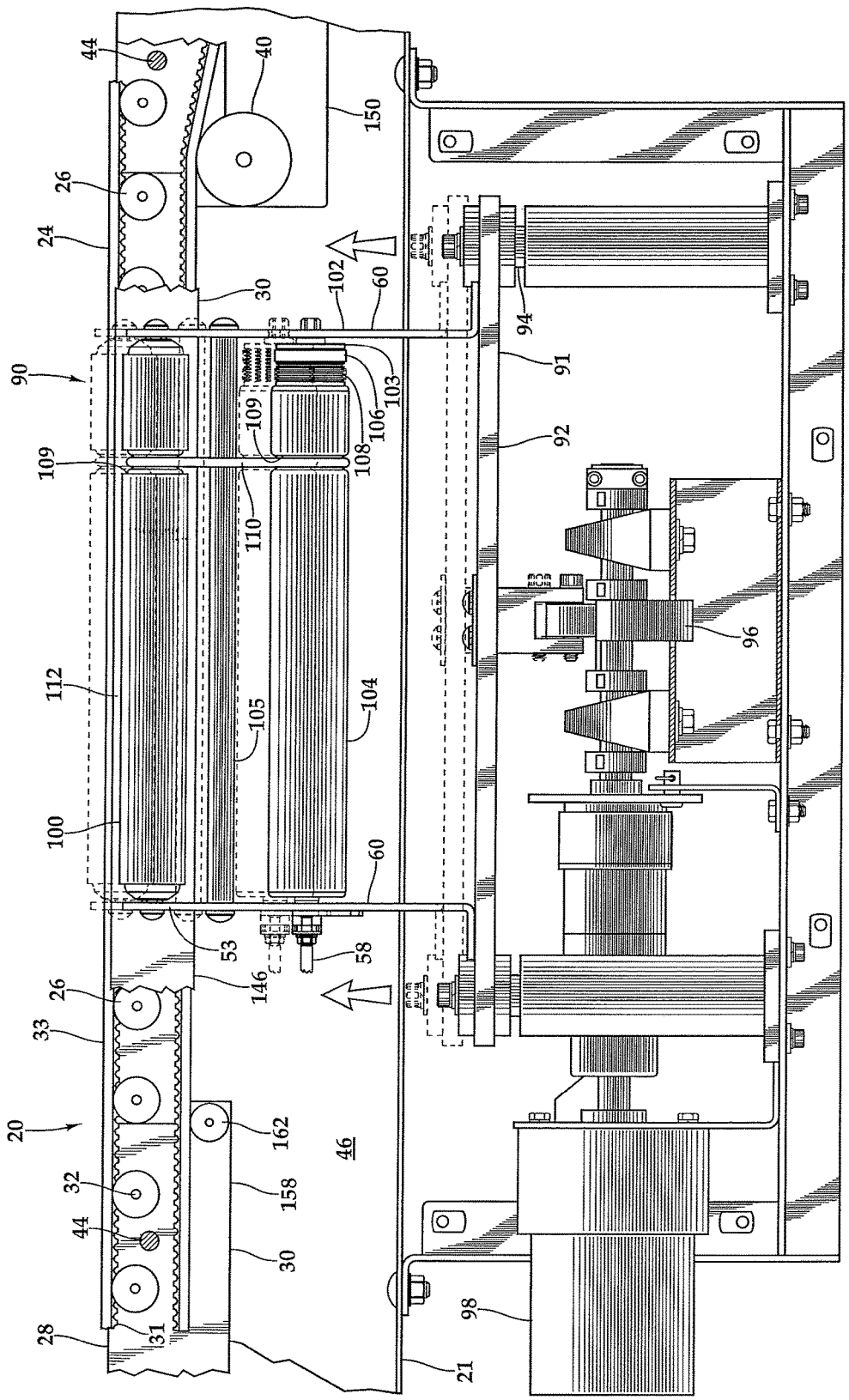
FIG. 4A is a side elevational view of the conveyor of FIG. 1 with the cross conveyor shown in a retracted configuration, and indicated in broken lines in an article engaging elevated position.
Figure 4B:
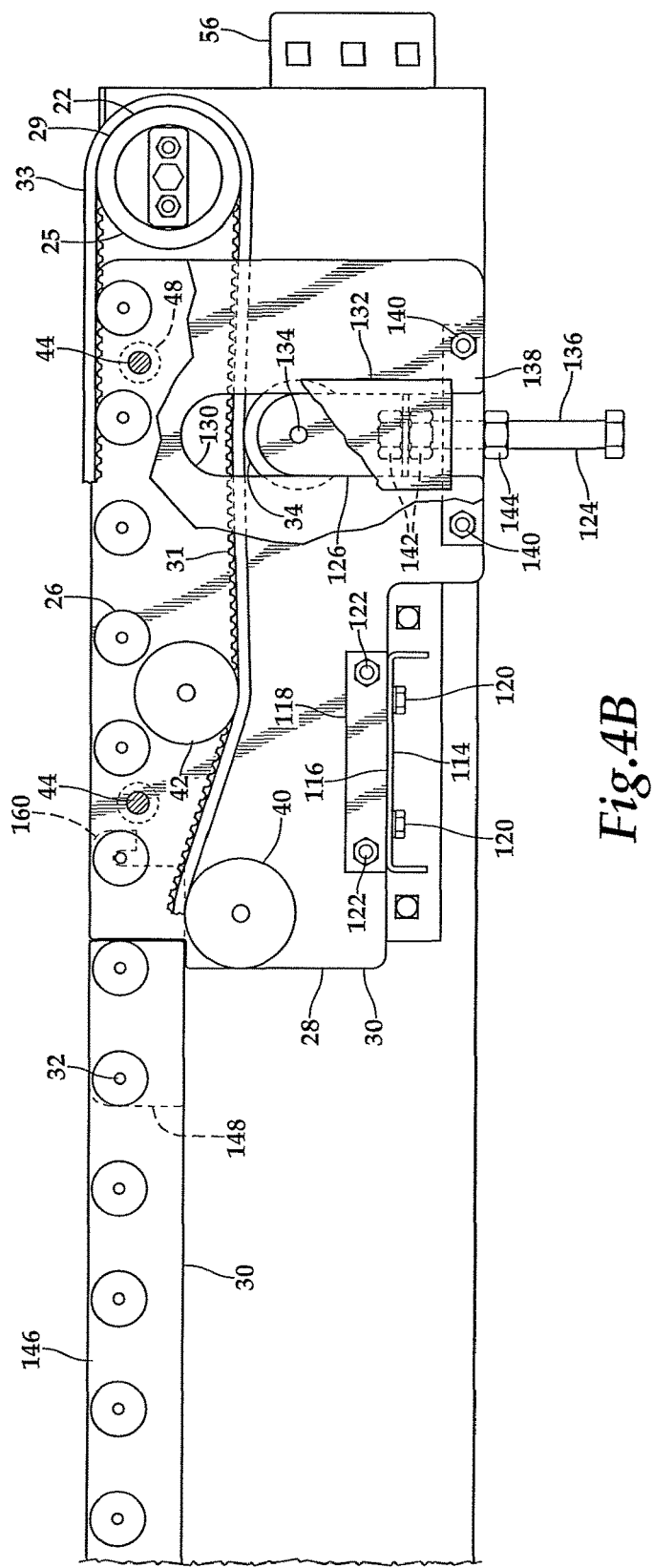
FIG. 4B is a fragmentary side elevational view of the conveyor of FIG. 1, partially broken away in section, showing the outfeed side of the conveyor.

Each belt 24 is supported as it runs from the inlet roller to the outlet roller 25 within rail assemblies 28 which, as shown in FIG. 4B, comprise an array of low friction nylon grooved rollers 26 which are rotatably mounted by pins 32 between parallel side plates 30. The pins 32 act as the axles on which the grooved rollers rotate and also hold the plates 30 together and spaced apart. The grooves of the rollers 26 receive and engage the protrusions 31 of the conveying belts 24.

As shown in FIG. 4B, the parallel side plates 30 of each rail assembly 28 extend above the grooved rollers. 26 mounted therebetween. Furthermore, the outwardly facing surface 33 of the conveying belt 24 which is supported on the grooved rollers extends above the rail assembly side plates, to thereby engage the conveyed article 35, while still being restrained against side to side motion.

As shown in FIG. 5, each rail assembly 28 is mounted to the frame 21. A shelf-like weldment or cross member 114 is connected by bolts 115 between the side members 46 of the frame 21 at a position beneath the belts and the rail assemblies 28. As shown in FIG. 6, similar weldments 114 are positioned in proximity to the inlet end and the outlet end of the conveyor 20. As shown in FIG. 5, the weldment 114 has a horizontal top wall 116 to which bar stock blocks 118 are connected by fasteners 120, blocks being mounted for each of the four rail assemblies 28. The side plates 30 of a particular rail assembly 28 extend on either side of a block in a cross-machine direction, and are connected thereto by fasteners 122. Thus the four rail assemblies 28 which receive and guide the four conveying belts 24 are all supported and positioned on each shelf-like weldment 114.

The rail assemblies 28 are further positioned within the conveyor 20 by six ⅜ inch threaded rods acting as spreaders or cross members 44 as shown in FIG. 6 which extend between the side members 46 of the conveyor and through the side plates 30 of all the rail assemblies 28 at a position internal to the conveying belt loops. Sleeves 48 are mounted about the threaded rods 44 between each rail assembly 28 to space and position the rail assemblies 28 between the conveyor side members 46, thus positioning the conveyor rails assemblies in the cross-machine direction.

As shown in FIGS. 4B and 5, the side plates 30 of the rail assemblies extend down below the level of the shelf-like weldments 114 at a position near the inlet and outlet rollers, and each rail assembly is provided with a belt tension roller assembly 124 which has a belt tensioning roller 34 which is rotatably mounted within a metal cradle 126. The cradle 126 has side walls 128 which have a rounded top, and which are received within downwardly opening slots 130 in the rail assembly side plates 30. Guide plates 132 are connected to the cradle 126 by fasteners 134 which extend through the cradle side walls 128 into the belt tensioning roller 34. The guide plates 132 overlie the rail assembly side plates 30, and retain the cradle side walls within the slots 130. As shown in FIG. 4B, the belt tension roller assembly 124 has a vertically extending threaded screw 136 which extends through a threaded hole in a horizontal metal block 138. The block 138 is mounted by fasteners 140 between the two parallel rail assembly side plates 30. The screw 136 projects into the cradle 126 and is retained to it by two nuts 142 which are pinned to the screw, one inside the cradle, and one below it. A further nut 144 is positioned on the screw 136 beneath the block 138 for fixing the tensioning roller at a desired position. Rotation of the screw 136 raises and lowers the cradle 126 and hence urges the belt tensioning roller 34 to engage against the conveying belt, to thereby apply the desired level of tension. Each rail assembly 28 has an upper grooved return roll 42 mounted between the parallel side plates 30 within the looped conveying belt, such that the conveying belt protrusion is engaged within the upper return roll groove. Further, each rail assembly 28 has a lower return roll 40 mounted between the parallel side plates exterior to the looped conveying belt, and need not have a groove, as it engages against the aggressive exterior surface of the belt 24.

As shown in FIGS. 4A, 4B and 5, each rail assembly has multiple side plates of varying height to extend the entire length of the conveyor 20. Middle side plates 158 are positioned in the middle of the conveyor 20, and the access side plates 146 extend on either side of the middle side plates in locations which may receive cross conveyors 90. The access side plates 146 are less tall then the end side plates 150 which are mounted to the shelf-like weldments 114. The access side plates 146 need only be as deep as the loop of the conveying belt 24, and may extend between the rolls of an optional cross conveyor as described below. The access side plates 146 are joined to the end side plates and the middle side plates 158 by connector plates 148 which span three grooved rollers 26 and may be held in place by the same pins 32 which hold the grooved rollers.

For ease of removal, the connector plates 148 may be provided with a hook 160, shown in FIGS. 3 and 4B, which extends over the shafts which mount a grooved roller 26 and which are secured by hex head screws. To remove the access side plates 146, the belt is removed, the hex head screw is loosened and the access side plate and attached connector plate can be lifted out. Each rail assembly has two access side plates 146 positioned in the machine direction between the two end side plates and the middle side plate. The access side plates 146 extend at a location so they are not pierced by a cross member 44, as a result, as indicated in FIG. 3, the access side plates 146 of the rail assemblies, along with their associated grooved rollers 26 may be lifted upwardly out of the conveyor 20 without disturbing the rest of the rail assembly 28. This provides access to the cross conveyor 90, when present, for convenient maintenance.

As shown in FIG. 6, the central section of the conveyor 20 is stiffened by a weldment defining a cross member 50 and comprised of a tube 52 welded to end plates 51 which are fastened to the side members 46 of the frame 21 by fasteners 152, shown in FIG. 7. The middle side plates 158 of the rail assemblies also mount three return rolls 162 outside the looped conveying belt 24 which support the return run of the belt. The middles side plates 158 have two threaded rods 44 extending therethrough, and do not connect directly to an underlying weldment.

Figure 2:
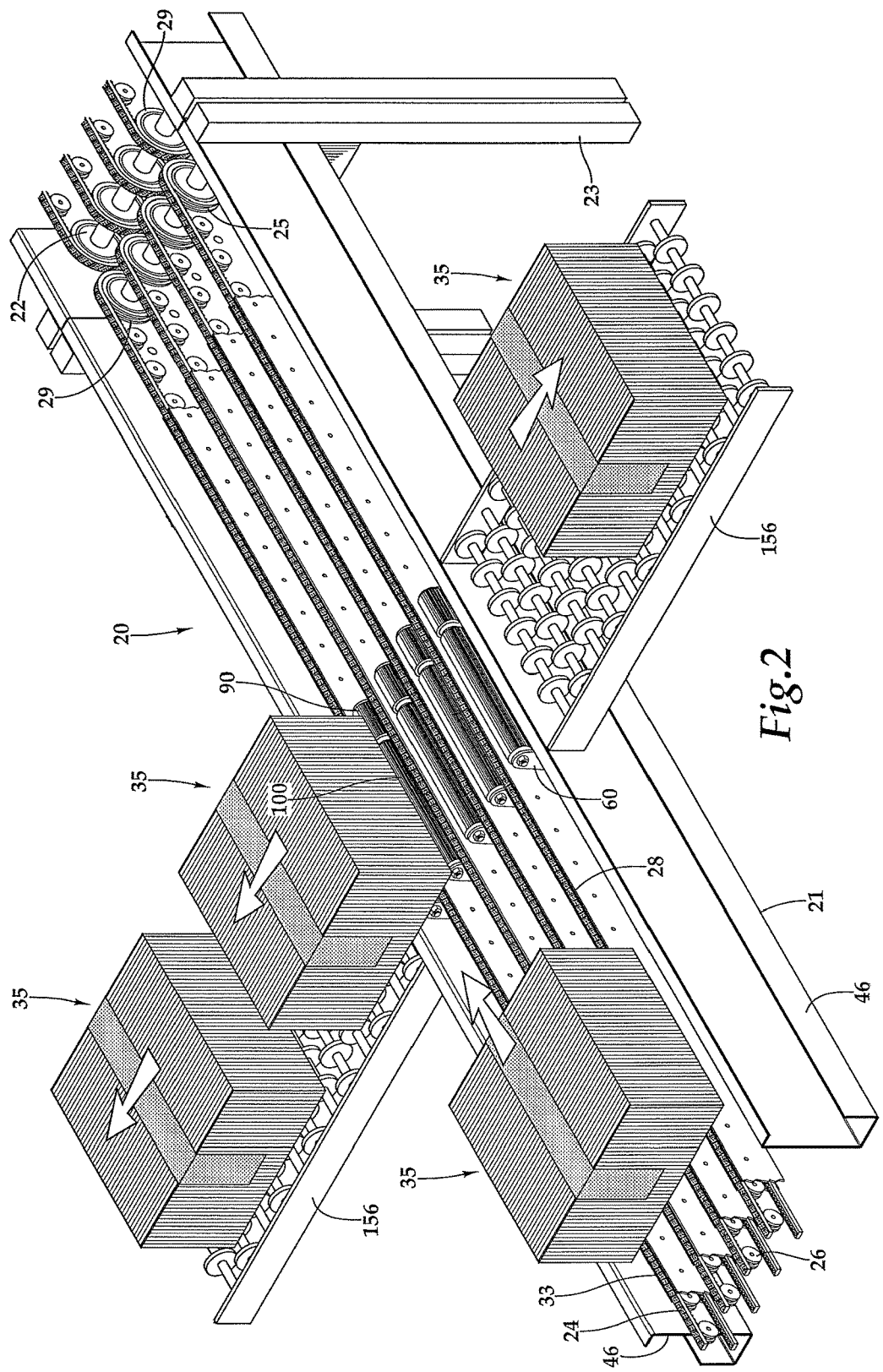
FIG. 2 is an isometric view, partially broken away, of the conveyor of FIG. 1 with a pop-up cross conveyor extending up between the belts to convey parcels in the cross-machine direction.

As shown in FIG. 6, a cross conveyor 90 may be mounted to the conveyor frame 21 in positions indicated by phantom lines. A cross conveyor 90 may be mounted adjacent the infeed end or the outfeed end of a conveyor 20, or a single module may include two cross conveyors, one in each position. As shown in FIG. 4A, the cross conveyor has an elevator assembly 91 which is fixed to the conveyor frame 21 to extend below the frame side members 46. The elevator assembly 91 has an aluminum plate which defines an elevator platform 92. The platform 92 is mounted to vertical guideposts 94. A motor 98 drives an eccentric drive 96 which is connected to the platform 92, in a fashion similar to that disclosed in my U.S. Pat. No. 9,365,361. The motor 98 is driven by a controller, not shown, to elevate or retract the platform when it is desired to divert a conveyed article at 90 degrees to the machine direction, as shown in FIG. 2.

A cross conveyor subframe 102 is mounted to the elevator platform 92 and has two parallel side members 60. Each side member 60 is a stiff plate with five upwardly extending fingers 53, best shown in FIG. 3. Bolts surrounded by sleeves 105 extend between opposed fingers 53, as shown in FIG. 4A, which stiffen the subframe. Five parallel lower rolls 104 are mounted for rotation and extend between the side members 60 beneath the fingers. Five parallel upper rolls 100 are mounted to the fingers 53 of the side members 60 above the lower rolls 104. The upper rolls 100 and lower rolls 104 are all rotatable about axes which are parallel to the machine direction. At least one of the lower rolls 104 is a drive roll 54, and preferably two are drive rolls. The second and the fourth lower rolls 104, for example, may be drive rolls, i.e., rolls with internal electric motors which may be supplied with power through power cords 58, as shown in FIG. 4A. The lower rolls 104 which are not drive rolls, for example the outer rolls and the middle roll in FIG. 3, are driven by a drive roll 54 through horizontal looped elastomeric drive belts 106. As shown in FIG. 4A, each lower roll 104 has two reduced diameter grooves 108 near an end 103. Thus, as shown in FIG. 3, a drive roll 54 has a looped belt 106 in a first groove 108 which extends to a similarly positioned groove on one neighboring driven roll, and another looped belt 106 in a second groove 108 which extends in the cross-machine direction to the other neighboring driven roll. In this way the two drive rolls 54 drive the three driven rolls, with the center roll 104 being driven by both drive rolls.

Each upper roll 100 and lower roll 104 has a peripheral groove 109 spaced inwardly from the roll ends 103. The grooves 109 in the upper rolls 100 are positioned directly above the grooves in the lower rolls 104, and an O-ring like elastomeric vertical belt 110 extends between each lower roll groove and the overlying upper roll groove, such that rotation of the lower rolls causes the upper rolls to rotate. The lower rolls 104 are driven to rotate in a common direction, such that the upper rolls, by means of the vertical belts 110, are driven to rotate in a common direction.

The upper rolls 100 have encircling upper roll covers 112 which provide high friction to both stop and laterally accelerate articles 35 moving along the conveying belts when the upper rolls are extended upwardly through the belts 24.

The subframe side member fingers 53 extend upwardly above the level of the horizontal belts 106 and are spaced from each other in a cross-machine direction. As shown in FIG. 3, gaps 154 are defined between each pair of upper rolls 100 and these gaps coincide with the spaces between the side member plates fingers, and are located above the lower rolls. Each gap provides a volume through which a rail assembly 28 extends. These gap volumes are positioned to avoid interference with the rail assemblies 28 when the elevator platform 92 is actuated, such that moving the elevator platform from the retracted to the extended position, as shown in FIG. 4A, causes portions of the upper rolls 100 to protrude above the outwardly facing surfaces 33 of the conveying belts 24 to thereby engage a conveyed article 35 and advance it in the cross machine direction, as shown in FIG. 2, for example onto a cross outfeed conveying surface 156. Moreover, in the extended position the subframe 102 and the lower rolls 104 do not interfere with the advancement of the looped conveying belts 24.

It should be noted that although the illustrated conveyor 20 is nine feet long, modules of greater length, for example twelve feet, may be constructed, as well as shorter ones, for example by shortening or eliminating the middle side plate portions of the rail assemblies.

It is understood that the invention is not limited to the particular construction and arrangement of parts herein illustrated and described, but embraces all such modified forms thereof as come within the scope of the following claims.

I claim:

1. A conveyor module for a modular conveyor apparatus, the conveyor module comprising:
   a frame;
   an inlet roller mounted to the frame;
   an outlet roller mounted to the frame;
   a plurality of looped conveying belts which extend around the inlet roller and the outlet roller for advancement in a machine direction extending from the inlet roller to the outlet roller, each looped conveying belt having an outwardly facing surface for engagement of a conveyed article; and
   a plurality of rail assemblies, each rail assembly having parallel side plates with a plurality of rollers mounted therebetween, and each rail assembly being mounted to the frame such that one of the looped conveying belts is supported on the rollers as it extends from the inlet roller to the outlet roller;
   a belt tension roller assembly associated with each of the rail assemblies, each belt tension roller assembly comprising:
   a belt tension roller; and
   a member connected to its associated rail assembly for adjustable vertical movement, the belt tension roller being mounted thereon, the member being adjustable to thereby engage the belt tension roller against the exterior of a looped conveying belt within a rail assembly and apply a desired tension to said looped conveying belt as it extends through the rail assembly within which it is mounted.

2. The conveyor module of claim 1 wherein the length of the conveyor module is nine feet.

3. The conveyor module of claim 1 wherein each looped conveying belt has an inwardly extending protrusion, and the plurality of rollers are grooved rollers, and wherein the inwardly extending protrusions of the conveying belts extend into the grooves of the grooved rollers.

4. The conveyor module of claim 3 further comprising within each rail assembly:
   an upper grooved return roll mounted between the parallel side plates within the looped conveying belt, such that the conveying belt protrusion is engaged within the upper return roll groove; and
   a lower return roll mounted between the parallel side plates exterior to the looped conveying belt.

5. The conveyor module of claim 3 wherein each looped conveying belt inwardly extending protrusion comprises a plurality of parallel teeth which facilitate the turning of conveying belt as it passes over the inlet and outlet rollers.

6. A conveyor apparatus comprising:
   a frame;
   an inlet roller mounted to the frame;
   an outlet roller mounted to the frame;
   a plurality of looped conveying belts which extend around the inlet roller and the outlet roller for advancement in a machine direction extending from the inlet roller to the outlet roller, each looped conveying belt having an outwardly facing surface for engagement of a conveyed article, and an inwardly extending protrusion; and
   a plurality of rail assemblies, each rail assembly having parallel side plates with a plurality of grooved rollers mounted therebetween, and each rail assembly being mounted to the frame such that one of the looped conveying belts is supported on the grooved rollers as it extends from the inlet roller to the outlet roller, the inwardly extending protrusion of said conveying belt extending into the grooves of the grooved rollers, wherein the parallel side plates of each rail assembly extend above the grooved rollers mounted therebetween, and wherein the outwardly facing surface of the conveying belt which is supported on the grooved rollers extends above the rail assembly side plates;
   wherein the rail assembly side plates extend downwardly to and are fixed to cross members which are connected to the frame beneath the looped conveying belts.

7. A conveyor apparatus comprising:
   a frame;
   an inlet roller mounted to the frame;
   an outlet roller mounted to the frame;
   a plurality of looped conveying belts which extend around the inlet roller and the outlet roller for advancement in a machine direction extending from the inlet roller to the outlet roller, each looped conveying belt having an outwardly facing surface for engagement of a conveyed article, and an inwardly extending protrusion;
   a plurality of rail assemblies, each rail assembly having parallel side plates with a plurality of grooved rollers mounted therebetween, and each rail assembly being mounted to the frame such that one of the looped conveying belts is supported on the grooved rollers as it extends from the inlet roller to the outlet roller, the inwardly extending protrusion of said conveying belt extending into the grooves of the grooved rollers;
   a plurality of cross members which are connected to the frame and which extend through the rail assembly side plates so as to pass through the loops of the conveying belts; and
   sleeves which surround the cross members and are positioned between rail assemblies to position them in a cross machine direction.

8. A conveyor apparatus comprising:
   a frame;
   an inlet roller mounted to the frame;
   an outlet roller mounted to the frame;
   a plurality of looped conveying belts which extend around the inlet roller and the outlet roller for advancement in a machine direction extending from the inlet roller to the outlet roller, each looped conveying belt having an outwardly facing surface for engagement of a conveyed article, and an inwardly extending protrusion; and
   a plurality of rail assemblies, each rail assembly having parallel side plates with a plurality of grooved rollers mounted therebetween, and each rail assembly being mounted to the frame such that one of the looped conveying belts is supported on the grooved rollers as it extends from the inlet roller to the outlet roller, the inwardly extending protrusion of said conveying belt extending into the grooves of the grooved rollers;
   a cross-conveyor assembly mounted to the frame, the cross-conveyor assembly comprising:
   an elevator platform mounted to the frame for movement from a retracted to an extended position;
   a subframe mounted to the elevator platform having a plurality of upwardly extending fingers;
   a plurality of upper rolls mounted to the fingers, and a plurality of lower rolls mounted to the subframe beneath the upper rolls, the upper rolls and the lower rolls being rotatable about axes which are parallel to the machine direction, wherein at least one of the lower rolls is a drive roll, and wherein any lower roll which is not a drive roll is driven by a lower roll that is a drive roll, and wherein each upper roll is connected to a lower roll by a vertical belt, such that the upper rolls are driven to rotate in the same direction; and gaps defined between each pair of upper rolls and located above the lower rolls, each gap providing a volume through which a rail assembly extends, such that the moving of the elevator platform from the retracted to the extended position causes portions of the upper rolls to protrude above the outwardly facing surfaces of the conveying belts to thereby engage a conveyed article and advance it in a cross machine direction, and wherein in the extended position the subframe and the lower rolls do not interfere with the advancement of the looped conveying belts.

9. The conveyor of claim 8 wherein each upper roll has a peripheral groove spaced from an upper roll end, and each lower roll has a peripheral groove beneath an upper roll peripheral groove, and wherein the vertical belts extend from the lower rolls to the upper rolls to engage within said lower roll peripheral grooves and said upper roll peripheral grooves.

10. A conveyor apparatus comprising:
a frame;
an inlet drive roller mounted to the frame;
an outlet roller mounted to the frame;
a plurality of looped conveying belts which extend around the inlet roller and the outlet roller for advancement in a machine direction extending from the inlet roller to the outlet roller, each looped conveying belt having an outwardly facing surface for engagement of a conveyed article;
a plurality of rail assemblies, each rail assembly having parallel side plates with a plurality of first rollers mounted therebetween, and each rail assembly being mounted to the frame such that one of the looped conveying belts is supported on the first rollers as it extends from the inlet roller to the outlet roller; and
a tensioning assembly mounted to each rail assembly to adjustably engage the looped belt within each rail assembly and apply a desired tension thereto.

11. The conveyor apparatus of claim 10 wherein the conveyor apparatus comprises a first module of a modular conveyor, and further comprising a second module positioned downstream of the first module, the second module comprising:
a second frame;
a second motorized inlet roller mounted to the second frame downstream of the first module outlet roller;
a second motorized outlet roller mounted to the second frame;
a plurality of second looped conveying belts which extend around the second inlet roller and the second outlet roller for advancement in a machine direction extending from the second inlet roller to the second outlet roller, each second looped conveying belt having an outwardly facing surface for engagement of a conveyed article received from the first modular conveyor, transferring from the first modular conveyor looped conveying belts to the second modular conveyor second looped conveying belts;
a plurality of second rail assemblies, each second rail assembly having parallel second side plates with a plurality of second rollers mounted therebetween, and each second rail assembly being mounted to the second frame such that one of the second looped conveying belts is supported on the second rollers as it extends from the second inlet roller to the second outlet roller; and a second tensioning assembly mounted to each second rail assembly to adjustably engage the second looped belt within each second rail assembly and apply a desired tension thereto.

12. A conveyor apparatus comprising: a frame;
an inlet roller mounted to the frame;
an outlet roller mounted to the frame;
a plurality of looped conveying belts which extend around the inlet roller and the outlet roller for advancement in a machine direction extending from the inlet roller to the outlet roller, each looped conveying belt having an outwardly facing surface for engagement of a conveyed article, wherein the conveying belts are spaced from each other in a cross-machine direction which is perpendicular to the machine direction;
an elevator platform mounted to the frame for movement from a retracted to an extended position;
a subframe mounted to the elevator platform having a plurality of upwardly extending fingers;
a plurality of upper rolls mounted to the fingers, and a plurality of lower rolls mounted to the subframe beneath the upper rolls, the upper rolls and the lower rolls being rotatable about axes which are parallel to the machine direction, wherein at least one of the lower rolls is a drive roll, and wherein any lower roll which is not a drive roll is driven by a lower roll that is a drive roll, and wherein each upper roll is connected to a lower roll by a vertical belt, such that the upper rolls are driven to rotate in the same direction; and
gaps defined between each pair of upper rolls and located above the lower rolls, each gap providing a volume through which one of the looped conveying belts extends, such that the moving of the elevator platform from the retracted to the extended position causes portions of the upper rolls to protrude above the outwardly facing surfaces of the conveying belts to thereby engage a conveyed article and advance it in a cross machine direction, and wherein in the extended position the subframe and the lower rolls do not interfere with the advancement of the looped conveying belts.

13. The conveyor of claim 12 wherein the lower rolls comprise at least two drive rolls, wherein each drive roll is positioned between two other lower rolls, and further comprising:
a first lower roll horizontal belt and a second lower roll horizontal belt extending from each drive roll to the two other lower rolls between which it is positioned, such that rotation of said drive roll causes the rotation of said two other lower rolls by operation of the first lower roll horizontal belt and the second lower roll horizontal belt.

14. The conveyor of claim 13 wherein each lower roll has a plurality of peripheral grooves, and wherein the first lower roll horizontal belt and the second lower roll horizontal belt are engaged within the peripheral grooves of the rolls.

15. The conveyor of claim 12 wherein each upper roll has a peripheral groove spaced from an upper roll end, and each lower roll has a peripheral groove beneath an upper roll peripheral groove, and wherein the vertical belts extend from the lower rolls to the upper rolls to engage within said lower roll peripheral grooves and said upper roll peripheral grooves.

16. The conveyor of claim 11 further comprising a plurality of rail assemblies, each rail assembly comprising:
- parallel side plates; and
- a plurality of rollers mounted between said side plates, wherein each of the looped conveying belts extends through one of said rail assemblies and is supported on the plurality of rollers of said rail assembly.

17. The conveyor of claim 16 further comprising:
- a cross member mounted to the frame beneath the looped conveying belts; and
- blocks mounted to the cross member, wherein the parallel side plates of each rail assembly are fixed to a block.

18. The conveyor of claim 16 wherein each rail assembly has a middle section which can be lifted out in an area in which a cross conveyor is positioned.

\* \* \* \* \*

UNITED STATES PATENT AND TRADEMARK OFFICE
CERTIFICATE OF CORRECTION

PATENT NO. : 10,351,353 B1
APPLICATION NO. : 16/053481
DATED : July 16, 2019
INVENTOR(S) : Donald Bruce Skarlupka Page 1 of 1

It is certified that error appears in the above-identified patent and that said Letters Patent is hereby corrected as shown below:

In the Specification

Column 4, Line 5, "extend above the grooved rollers. 26" should be --extend above the grooved rollers 26--.

In the Claims

Column 11, Line 1, "The conveyor of claim 11" should be --The conveyor of claim 12--.

Signed and Sealed this
Fifth Day of November, 2019

Andrei Iancu
*Director of the United States Patent and Trademark Office*